United States Patent
Rochotzki et al.

(10) Patent No.: US 12,203,621 B2
(45) Date of Patent: Jan. 21, 2025

(54) VEHICLE HEADLIGHT LENS WITH PERFLUOROCARBON ANTI-REFLECTIVE COATING

(71) Applicant: Hella GmbH & Co. KGaA, Lippstadt (DE)

(72) Inventors: Ralf Rochotzki, Lippstadt (DE); Fahri Uslu, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/454,592

(22) Filed: Aug. 23, 2023

(65) Prior Publication Data

US 2024/0068637 A1 Feb. 29, 2024

(30) Foreign Application Priority Data

Aug. 24, 2022 (DE) .......................... 102022121364.1

(51) Int. Cl.
*F21S 41/275* (2018.01)
*F21S 41/265* (2018.01)
*G02B 1/111* (2015.01)

(52) U.S. Cl.
CPC ........... *F21S 41/275* (2018.01); *F21S 41/265* (2018.01); *G02B 1/111* (2013.01)

(58) Field of Classification Search
CPC ........ F21S 41/275; F21S 41/265; G02B 1/111
See application file for complete search history.

(56) References Cited

U.S. PATENT DOCUMENTS

| | | | | |
|---|---|---|---|---|
| 4,264,140 | A * | 4/1981 | Harrison | G02B 1/111 428/441 |
| 5,171,606 | A * | 12/1992 | Mayer | G11B 7/2542 427/255.6 |
| 9,400,343 | B1 * | 7/2016 | Pethuraja | G02B 1/111 |
| 2009/0047504 | A1 * | 2/2009 | Wu | G02B 1/111 428/421 |
| 2012/0314442 | A1 * | 12/2012 | Takahashi | G02B 6/0068 362/327 |
| 2014/0029284 | A1 * | 1/2014 | Giraud | G02B 6/0033 362/511 |
| 2018/0100103 | A1 * | 4/2018 | Katoh | C09K 19/56 |

FOREIGN PATENT DOCUMENTS

DE 102020100762 A1 7/2021
JP 11223706 A 8/1999

* cited by examiner

*Primary Examiner* — Tracie Y Green
*Assistant Examiner* — Michael Chiang
(74) *Attorney, Agent, or Firm* — Husch Blackwell LLP

(57) ABSTRACT

A lens is provided for use in a multi-lens system of a headlamp of a motor vehicle. The lens includes a lens body with a first surface and a second surface arranged opposite the first surface. An anti-reflective coating made of a perfluorocarbon is arranged directly on the lens body. The anti-reflective coating is arranged at an end of the lens.

16 Claims, 4 Drawing Sheets

VEHICLE HEADLIGHT LENS WITH PERFLUOROCARBON ANTI-REFLECTIVE COATING

CROSS REFERENCE

This application claims priority to German Application No. 102022121364.1 filed Aug. 24, 2022, the entirety of which is hereby incorporated by reference.

FIELD OF THE INVENTION

The invention relates to a lens for use in a multi-lens system of a headlamp of a motor vehicle, a multi-lens system, comprising a lens, a headlamp for use in a motor vehicle, comprising such a lens and a motor vehicle, comprising a lens, preferentially a headlamp with a lens.

BACKGROUND OF THE INVENTION

In modern headlamp systems, constantly increasing requirements are being placed on the achievable light intensity. In particular in headlamps with multi-lens systems (e.g. high-resolution, miniaturized LED matrix systems) the inevitable light reflection at every individual lens leads to a reduction in the maximum achievable light intensity. In order to meet the increasing requirements placed on the light intensity, one known solution is to increase the number of light sources used in a headlamp. As a disadvantage, both from the perspective of energy technology and costs as well as for reasons of thermal management, the use of additional light sources does not constitute an appropriate means of increasing the achievable light intensity of a headlamp.

Another possibility to increase the light intensity in headlamps is to apply anti-reflective coatings to the lenses. The known anti-reflective coatings are usually designed as multiple layers of metal oxides, such as $TiO_2$ $SiO_2$. Using such layers in lens systems makes it possible to reduce the reflections at the lenses and to increase the achievable light intensity of headlamps with such lenses or lens systems.

As a disadvantage, the known coatings made of multiple layers of metal oxides in particular on plastics are susceptible to crack formations and consequently only very unstable. The high requirements placed on the durability and resistance in the automotive sector consequently are reasons against employing such coating structures for use in headlamps of motor vehicles.

BRIEF SUMMARY OF THE INVENTION

Consequently, one task of the present invention is to at least partially remedy the aforementioned disadvantages known from the current state of technology. In particular, one task of the present invention is to increase in a simple and cost-effective manner the light intensity achievable by means of a headlamp and at the same time ensure a high durability and long service life of the headlamps.

The aforementioned task is accomplished by a lens, a multi-lens system, a headlamp, a motor vehicle, and a method, all as described herein. Additional features and details of the invention can be found in the description and drawings. In this context, the features and details that are described in connection with the inventive lens also apply in connection with the inventive multi-lens system, or the inventive headlamp or the inventive motor vehicle, or the inventive method.

According to a first aspect of the invention, a lens for employment in a multi-lens system of a headlamp of a motor vehicle is provided for. The inventive lens comprises a lens body with a first surface and a second surface arranged opposite the first surface and an anti-reflective coating made of a perfluorocarbon arranged directly on the lens body, wherein the anti-reflective coating is arranged at the end of the lens. The perfluorocarbon or, as the case may be, the layer of perfluorocarbon can be fashioned preferentially from one of the following perfluorocarbons: PTFE (polytetrafluoroethylene), FEP (fluorinated ethylene propylene) or $CF_4$ (tetrafluoromethane).

The inventive lens can be used in particular in the headlamps of passenger cars or trucks. Furthermore, use of the lens is conceivable in the headlamps for excavators, fork lift trucks or boats, or similar. Within the context of the invention, an inventive lens with an antireflective coating can be understood in particular to be a lens with a coating that leads to a reduction in reflection when light passes through the lens body. According to the invention, a multi-lens system can be understood to be preferentially a system of a plurality of lenses that are arranged preferentially one after the other and aligned to each other in a targeted manner in order to control how the light is bundled and/or scattered. Within the scope of the invention, a lens body is understood preferentially to be a usually disc-shaped optically transparent body limited by curved surfaces, by means of which the propagation of light can be influenced. According to the invention, an anti-reflective coating is preferentially understood to be the layer that can be applied to the lens body to reduce reflections. Within the scope of the invention, arrangement at the end of the lens can be understood in particular to be an arrangement closed off to the outside in which no further layer is arranged at the layer arranged at the end. It is understood that both the lens body and the anti-reflective coating in the present case are fashioned from a material that is preferentially fully transparent in the optical spectral range (wavelength range from 380 nm to 780 nm).

The combination provided for by the invention of a direct arrangement of the anti-reflective coating made of a perfluorocarbon on the lens body and the simultaneous arrangement at the end of the anti-reflective coating made of a perfluorocarbon leads to a significant reduction in light reflections at the lens, which in turn significantly increases the light intensity of a headlamp with such a lens. By using this mono-layer design of an anti-reflective coating in combination with a structural similarity between the anti-reflective coating and the lens body (both being polymers, for example), the lens in the present case is very robust and resistant and features a long service life. The end arrangement of the anti-reflective coating made of a perfluorocarbon additionally facilitates an easy-to-clean lens, as the perfluorocarbon layer features poor water wettability with water contact angles in excess of 140°. Correspondingly, the antireflective coating made of a perfluorocarbon can be seen as being super hydrophobic that minimizes dirt adhesion.

As an advantage, it can be provided for the lens body to be fashioned from an optically transparent material, preferentially made from one of the following materials: glass, preferentially B270 or BK7 crown glass, PMMA, preferentially PMMA 8N, polycarbonate, preferentially PC LED 2245 or PC 2205. The aforementioned materials have proven to be, in particular in combination with the inventive anti-reflective coating made of a perfluorocarbon, to be especially suitable for minimizing light reflections.

With regard to the possibility of an especially effective reduction in the reflectivity of a lens when light is passing through the lens body, it can furthermore be advantageously provided for the anti-reflective coating to feature a layer thickness of between 50 and 120 nm, preferentially a layer thickness of between 90 and 110 nm.

Within the scope of an effective increase in the achievable light intensity of a headlamp, when using the lens it can be advantageously provided for that lens to feature a transmissivity in the visible spectral range of >95%, preferentially of >96%, especially of >97%.

To further minimize the reflectivity of a lens, the invention can advantageously provide for a first and a second anti-reflective coating made of a perfluorocarbon, wherein the first anti-reflective coating is arranged directly on the first surface of the lens body and the second anti-reflective coating is arranged directly on the second surface of the lens body, wherein preferentially both anti-reflective coatings are arranged at the end of the lens. In this way, it is possible to minimize not only the reflections during the passage of light at the first but also during the passage of light at the second surface of the lens.

Within the scope of further optimization of the minimization of reflection at the lens, it can be further provided for the first and a second anti-reflective coating made of a perfluorocarbon to feature the same layer thickness. Alternatively, it can also be provided for the layer thickness of the anti-reflective coatings to be adjusted to the curvature of the lens body.

In this respect and with regard to effective minimization of the reflectivity of a lens in the present case, it can be advantageously provided that the layer thickness of the lens body has at least 10,000 times the layer thickness of the first or second anti-reflective coating, preferentially at least 20,000 times the layer thickness of the first or second anti-reflective coating.

Within the scope of manufacturing in a simple and cost-effective manner a high-grade coating structure comprising small layer thicknesses of less than 130 nm, the invention can advantageously provide for it to be possible for the anti-reflective coating to be manufactured by means of a vapor deposition method, preferentially by means of a PVD or CVD-method.

Another object of the invention is furthermore a multi-lens system for arrangement within a headlamp of a motor vehicle, comprising a plurality of lenses as described above. In this way, the inventive multi-lens system has the same advantages as were already described in more detail in relation to the inventive lens.

Another object of the invention is furthermore a headlamp for use in a motor vehicle, comprising a lens as described above, preferentially a multi-lens system as described above. In this way, the inventive headlamp has the same advantages as were already described in more detail in relation to the inventive lens or the inventive multi-lens system.

Another object of the invention is furthermore a motor vehicle, comprising a lens as described above preferentially comprising a multi-lens system as described above, in particular comprising a headlamp as described above. In this way, the inventive motor vehicle has the same advantages as were already described in more detail in relation to the inventive lens or the inventive multi-lens system or the inventive headlamp.

Another object of the invention is furthermore a method for manufacturing a lens, preferentially a lens as described above. In this context, the inventive method comprises the steps of producing a lens body with a first surface and a second surface arranged opposite the first surface, applying a first anti-reflective coating made from a perfluorocarbon directly to the first surface of the lens body and preferentially applying a second anti-reflective coating made of a perfluorocarbon directly to the second surface of the lens body. In this way, the inventive method has the same advantages as were already described in more detail in relation to the inventive lens or the inventive multi-lens system or the inventive headlamp, or the inventive motor vehicle.

Within the scope of manufacturing in a simple and cost-effective manner a high-grade coating structure comprising small layer thicknesses of less than 130 nm, the invention can advantageously provide for application of the first and/or second anti-reflective coating made of a perfluorocarbon to be performed by means of a vapor deposition method, preferentially by means of a PVD or CVD method.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE INVENTION

In the following description regarding some sample embodiments of the invention, the identical reference numbers are also used for the same technical features in different sample embodiments.

Figure 1:
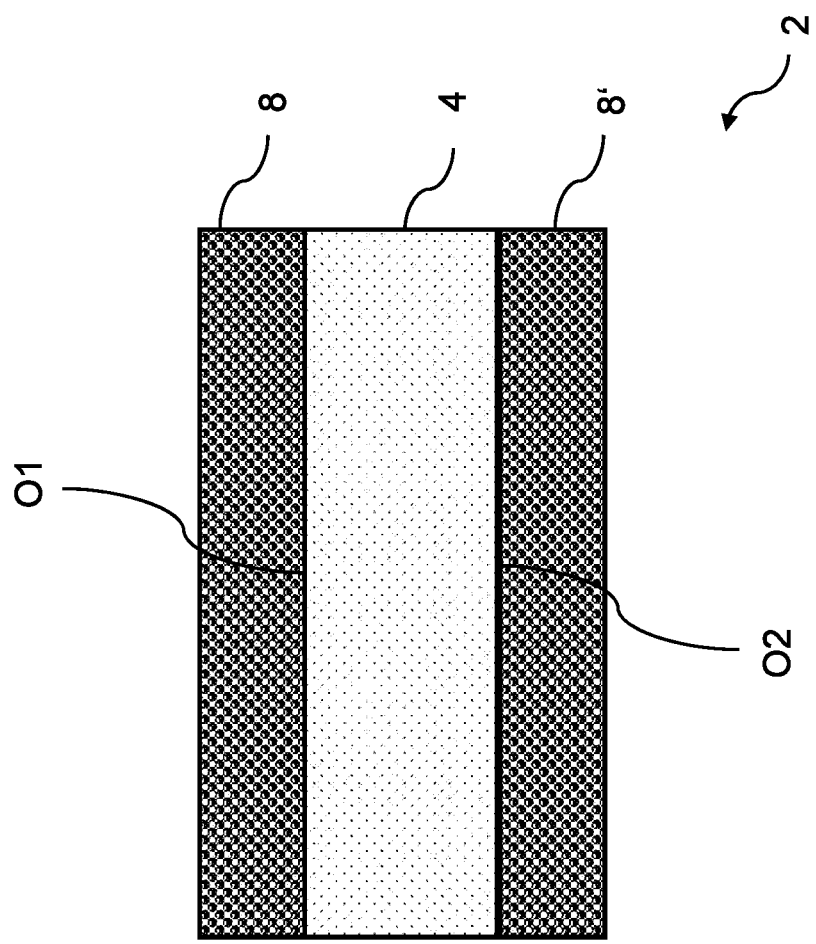
FIG. 1 is a schematic representation of an inventive lens for use in a multi-lens system of a headlamp of a motor vehicle according to a first sample embodiment.

FIG. 1 shows a schematic representation of an inventive lens 2 for use in a multi-lens system 1 of a headlamp 30 of a motor vehicle 40 according to a first sample embodiment.

As can be seen from FIG. 1, the inventive lens 2 comprises a lens body 4 with a first surface O1 and a second surface O2 arranged opposite the first surface O1 and an anti-reflective coating 8 made of a perfluorocarbon arranged directly on the lens body 4, wherein the anti-reflective coating 8 is arranged at the end of the lens 2.

In addition, the lens 2 further comprises a second anti-reflective coating 8' made of a perfluorocarbon that is arranged directly on the second surface O2 of the lens body 4 and is likewise positioned at the end of the lens 2.

The lens body 4 can be fashioned preferentially from an optically transparent material such as glass, preferentially B270 or BK7 crown glass, PMMA, preferentially PMMA 8N, polycarbonate, preferentially PC LED 2245 or PC 2205.

The anti-reflective coating 8 can preferentially feature a layer thickness between 50 and 120 nm, in particular a layer thickness between 90 and 110 nm.

With a lens 2 fashioned in this way, it is possible to maintain a transmissivity in the visible spectral range of >95%, preferentially of >96%, in particular of >97%.

With a lens 2 fashioned as in the present case that is advantageously manufactured by means of a vapor deposition method, preferentially by means of a PVD or CVD method, it is in particular possible to maintain a reflectivity in the visible spectral range of >95%, preferentially of >96%, in particular of >97%.

Figure 2:
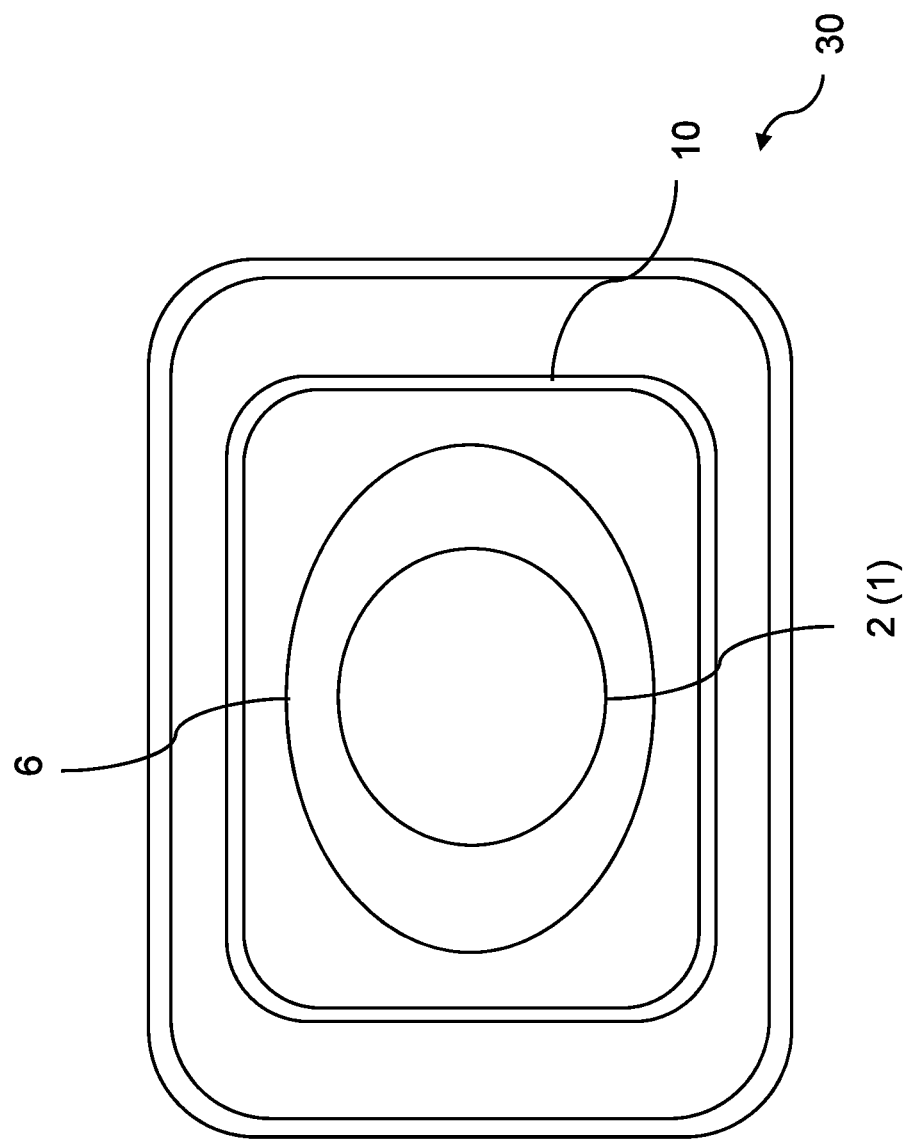
FIG. 2 is a schematic representation of an inventive headlamp for use in a motor vehicle, with an inventive lens.

FIG. 2 shows a schematic representation of an inventive headlamp 30 for use in a motor vehicle 40 with an inventive lens 2, preferentially an inventive multi-lens system 1, that in the present case are arranged in a bezel 10 within a reflector 6.

Figure 3:
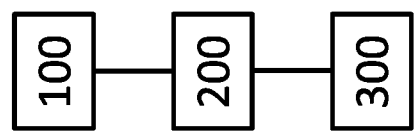
FIG. 3 is a schematic representation of the individual steps of an inventive method for manufacturing an inventive lens.

FIG. 3 shows a schematic representation of the individual steps of an inventive method for manufacturing an inventive lens 2.

As can be seen according to FIG. 3, the inventive method comprises the steps of producing 100 a lens body 4 with a first surface O1 and a second surface O2 arranged opposite the first surface O1, applying 200 a second anti-reflective coating 8 made from a perfluorocarbon directly to the first surface O1 of the lens body 4 and applying 300 a second anti-reflective coating 8' made of a perfluorocarbon directly to the second surface O2 of the lens body 4.

In this context, the application 200, 300 of the first and/or second anti-reflective coating 8, 8' made of a perfluorocarbon can be preferentially performed by means of a vapor deposition method, in particular by means of a PVD or CVD method.

Figure 4:
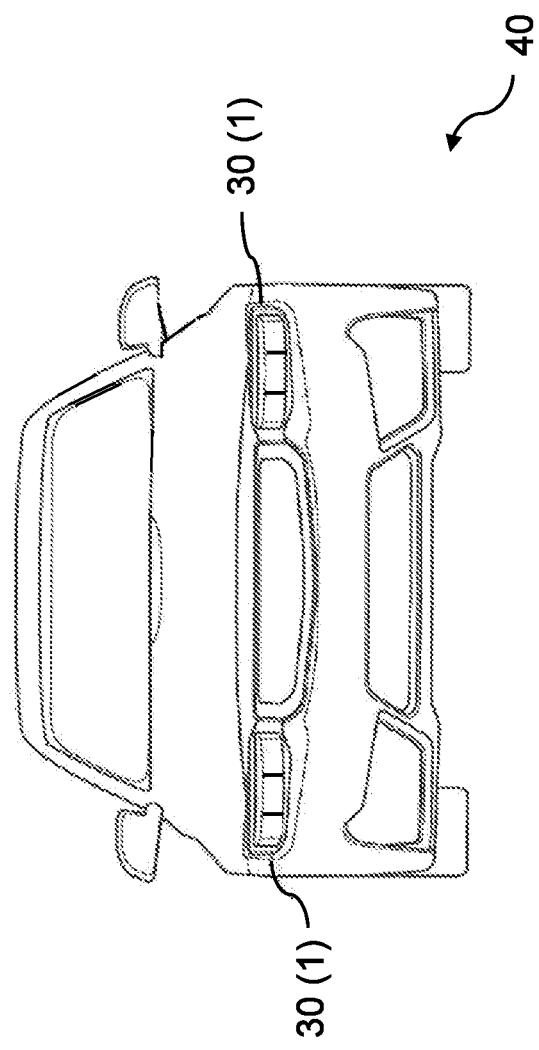
FIG. 4 is a schematic representation of a motor vehicle with a headlamp, comprising an inventive multi-lens system.

FIG. 4 shows a schematic representation of a motor vehicle 40 with headlamps 30, each comprising an inventive multi-lens system 1.

By means of a lens 2 fashioned according to the invention, it is in particular possible when using the lens in a headlamp to increase in a simple and cost-effective manner the light intensity achievable by means of a headlamp and at the same time ensure a high durability and long service life of the headlamp.

LIST OF REFERENCE NUMBERS

1 Multi-lens system
2 Lens
4 Lens body
6 Reflector
8 First anti-reflective coating
8' Second anti-reflective coating
10 Bezel
30 Headlamp
40 Motor vehicle
100 Production of a lens body
200 Application of a first anti-reflective coating
300 Application of a second anti-reflective coating
O1 First surface
O2 Second surface

We claim:

1. A lens for use in a multi-lens system of a headlamp of a motor vehicle, the lens comprising:
a lens body with a first surface and a second surface arranged opposite the first surface;
a first anti-reflective coating made of tetrafluoromethane arranged directly on the first surface; and;
a second anti-reflective coating made of tetrafluoromethane arranged directly on the second surface.

2. The lens in accordance with claim 1, wherein the lens body is fashioned from an optically transparent material.

3. The lens in accordance with claim 1, wherein the first anti-reflective coating and the second anti-reflective coating each features a layer thickness between 50 and 120 nm.

4. The lens in accordance with claim 1, wherein the lens has a transmissivity in the visible spectral range of >95%.

5. The lens in accordance with claim 1, wherein the first anti-reflective coating and the second anti-reflective coating have the same layer thickness.

6. The lens in accordance with claim 1, wherein the layer thickness of the lens body has at least 10,000 times the layer thickness of the first anti-reflective coating or the second anti-reflective coating.

7. The lens in accordance with claim 1, wherein the first anti-reflective coating and the second anti-reflective coating are manufactured by a vapor deposition method.

8. A multi-lens system for arrangement within a headlamp of a motor vehicle, comprising a plurality of lenses in accordance with claim 1.

9. A headlamp for use in a motor vehicle, comprising a lens in accordance with claim 1.

10. A motor vehicle, comprising a lens in accordance with claim 1.

11. A lens for use in a multi-lens system of a headlamp of a motor vehicle, the lens comprising:
a lens body with a first surface and a second surface arranged opposite the first surface;
a first anti-reflective coating made of a perfluorocarbon with the composition $C_xF_y$ and arranged directly on the first surface; and
a second anti-reflective coating made of a perfluorocarbon with the composition $C_xF_y$ and arranged directly on the second surface;
wherein the lens body has a thickness at least 20,000 times greater than the thickness of each of the first anti-reflective coating and the second anti-reflective coating.

12. A multi-lens system for arrangement within a headlamp of a motor vehicle, comprising a plurality of lenses in accordance with claim 11.

13. A headlamp for use in a motor vehicle, comprising a lens in accordance with claim 11.

14. A motor vehicle, comprising a lens in accordance with claim 11.

15. A lens for use in a multi-lens system of a headlamp of a motor vehicle, the lens comprising:
a lens body with a first surface and a second surface arranged opposite the first surface;
a first anti-reflective coating made of a perfluorocarbon with the composition $C_xF_y$ and arranged directly on the first surface; and
a second anti-reflective coating made of a perfluorocarbon with the composition $C_xF_y$ and arranged directly on the second surface;
wherein the first anti-reflective coating and the second anti-reflective coating each has a layer thickness between 90 nanometers and 110 nanometers.

16. A multi-lens system for arrangement within a headlamp of a motor vehicle, comprising a plurality of lenses in accordance with claim 15.

* * * * *